(12) United States Patent
Kraufvelin et al.

(10) Patent No.: US 9,198,153 B2
(45) Date of Patent: Nov. 24, 2015

(54) PROVISION OF INFORMATION REGARDING A MOBILE STATION

(75) Inventors: Sebastian Kraufvelin, Tenhola (FI); Jan Kall, Esbo (FI); Tomi Varonen, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 1236 days.

(21) Appl. No.: 10/529,697

(22) PCT Filed: Oct. 3, 2003

(86) PCT No.: PCT/IB03/04387
§ 371 (c)(1),
(2), (4) Date: Oct. 20, 2005

(87) PCT Pub. No.: WO2004/034721
PCT Pub. Date: Apr. 22, 2004

(65) Prior Publication Data
US 2006/0135174 A1    Jun. 22, 2006

(30) Foreign Application Priority Data

Oct. 9, 2002 (GB) .................................... 0223498.7
Feb. 17, 2003 (GB) .................................... 0303626.6

(51) Int. Cl.
*H04W 64/00* (2009.01)

(52) U.S. Cl.
CPC ..................... *H04W 64/00* (2013.01)

(58) Field of Classification Search
CPC ................................................. H04W 64/00
USPC .................... 455/456.1–457, 414.1–414.3
See application file for complete search history.

(56) References Cited

U.S. PATENT DOCUMENTS

| 5,255,307 | A | 10/1993 | Mizikovsky | 379/58 |
| 5,365,516 | A | 11/1994 | Jandrell | 370/18 |
| 5,621,414 | A * | 4/1997 | Nakagawa | 342/350 |
| 6,169,899 | B1 * | 1/2001 | Havinis et al. | 455/433 |
| 6,370,383 | B1 | 4/2002 | Leatham | 455/446 |
| 6,484,033 | B2 * | 11/2002 | Murray | 455/456.3 |

(Continued)

FOREIGN PATENT DOCUMENTS

| CN | 1422082 A | 6/2003 | H04N 11/00 |
| EP | 1 162 853 A1 | 12/2001 | |

(Continued)

OTHER PUBLICATIONS

Office Action in Korean Patent Application No. 7006174/2005; English Language translation; Jul. 25, 2006, 2 pages.

(Continued)

*Primary Examiner* — Marcos Torres
(74) *Attorney, Agent, or Firm* — Ditthavong & Steiner, P.C.

(57) ABSTRACT

A method of providing information regarding a mobile station adapted for communication via a communication system is provided. In the method an area even notification request is received at a location service entity provided in association with the communication system, the area event notification request containing information associated with the identity of the mobile station and an area of interest. Monitoring for an even indicative of a change in the presence status of the mobile station relative to said area of interest is then activated. A notification is signalled in response to detection of such event.

18 Claims, 17 Drawing Sheets

(56) References Cited

U.S. PATENT DOCUMENTS

| | | | |
|---|---|---|---|
| 6,574,201 B1 | 6/2003 | Kreppel | 370/328 |
| 6,599,757 B1 | 7/2003 | Murai | 438/3 |
| 7,024,195 B2* | 4/2006 | Miriyala et al. | 455/443 |
| 7,203,502 B2* | 4/2007 | Wilson et al. | 455/456.2 |
| 2004/0203856 A1* | 10/2004 | Wigren et al. | 455/456.1 |
| 2004/0203900 A1* | 10/2004 | Cedervall et al. | 455/456.1 |
| 2006/0142018 A1* | 6/2006 | Matz et al. | 455/452.2 |

FOREIGN PATENT DOCUMENTS

| | | | |
|---|---|---|---|
| GB | 2 384 398 | 11/2002 | H04Q 7/34 |
| JP | 11-069404 | 9/1999 | H04Q 7/20 |
| JP | 11-338870 | 10/1999 | G06F 17/30 |
| JP | 2000-13849 | 1/2000 | H04Q 7/34 |
| JP | 2000-311296 | 11/2000 | H04B 7/26 |
| JP | 2001-14592 | 1/2001 | H04Q 7/34 |
| JP | 2001-186558 A | 7/2001 | |
| JP | 2002232952 | 8/2002 | H04Q 7/38 |
| JP | 2002-260184 | 9/2002 | H04Q 7/34 |
| KR | 2001-111049 | 12/2001 | H04B 7/26 |

OTHER PUBLICATIONS

Office Action in Japanese Patent Application No. 2005-501003; English Language translation, Aug. 1, 2007, 2 pages.

Office Action in Chinese Patent Application No. 200380101163.9; English language translation; Nov. 30, 2007; 8 pages.

Office Action in Japanese Patent Application No. 2005-501003; English Language translation, Apr. 11, 2008, 3 pages.

Universal Mobile Telecommunications Systems (UMTS); Functional Stage 2 description of location services (3GPP TS 23.271 version 4.1.0 Release 4), pp. 1-70.

Decision by Board of Appeal for corresponding JP application No. 2005-501003, Aug. 1, 2011, pp. 1-11.

Japanese Office action for corresponding JP application No. 2009-089637, Jun. 13, 2011, pp. 1-5.

Japanese Office action for corresponding JP application No. 2005-501003 dated Feb. 24, 2011, pp. 1-15.

* cited by examiner

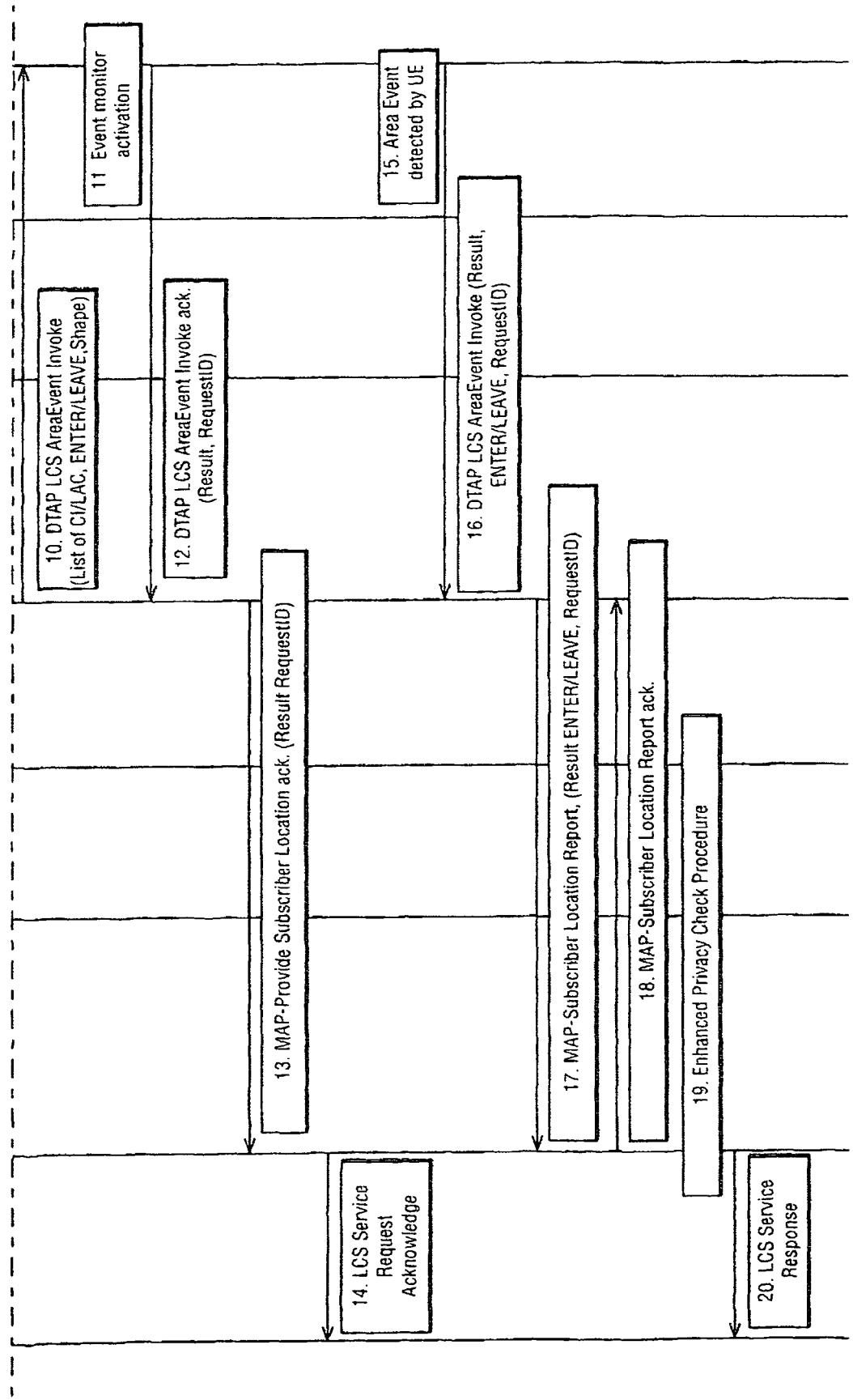
Fig. 4 (Contd.)

Fig. 5

```
ProvideSubscriberLocation-Arg ::= SEQUENCE {
locationType         LocationType,
mlc-Number           ISDN-AddressString,
lcs-ClientID         [0] LCS-ClientID              OPTIONAL,
privacyOverride      [1] NULL                      OPTIONAL,
imsi                 [2] IMSI                      OPTIONAL,
msisdn               [3] ISDN-AddressString        OPTIONAL,
lmsi                 [4] LMSI                      OPTIONAL,
imei                 [5] IMEI                      OPTIONAL,
lcs-Priority         [6] LCS-Priority              OPTIONAL,
lcs-QoS              [7] LCS-QoS   OPTIONAL,
extensionContainer   [8] ExtensionContainer        OPTIONAL,
... ,
supportedGADShapes   [9]  SupportedGADShapes       OPTIONAL,
lcsServiceTypeID     [10] LCSServiceTypeID         OPTIONAL,
lcsCodeword          [11] LCSCodeword              OPTIONAL,
lcsTriggerArea       [12] Ext-Geographical
                          Information              OPTIONAL,
requestID            [13] RequestID                OPTIONAL }

DeferredLocationEventType ::= BIT STRING {
msAvailable          (0),
areaEventEnter       (1),
areaEventLeave       (2) } (SIZE (1..16))
```

Fig. 6

| Information element | Type/Reference | Presence | Format | Length in octets |
|---|---|---|---|---|
| Message type | Message type | M | V | 1 |
| Location Type | Location Type | M | TLV | 3-4 |
| Cell Identifier | Cell Identifier | O | TLV | 3-10 |
| Classmark information Type 3 | Classmark information Type 3 | O | TLV | 2-n |
| LCS Client Type | LCS Client Type | C | TLV | 3 |
| Chosen Channel | Chosen Channel | O | TLV | 2-n |
| LCS Priority | LCS Priority | O | TLV | 3 |
| LCS QoS | LCS QoS | O | TLV | 6 |
| Requested GPS Assistance Data | Requested GPS Assistance Data | O | TLV | 3-n |
| BSSLAP APDU | APDU | O | TLV | 2-n |
| LCS Capability | LCS Capability | O | TLV | 3-n |
| Packet Measurement Report | Packet Measurement Report | O | TLV | 2-n |
| Measured Cell Identity List | Cell Identity List | O | TLV | 6-n |
| Shape | Shape | C | ??? | ??? |

Fig. 7

| 8 | 7 | 6 | 5 | 4 | 3 | 2 | 1 | |
|---|---|---|---|---|---|---|---|---|
| | | | IEI | | | | | Octet 1 |
| | | | Length indicator | | | | | Octet 2 |
| | | | Location Information | | | | | Octet 3 |
| | | | Positioning Method | | | | | Octet 4 |

Fig. 8

| Information element | Type/Reference | Presence | Format | Length in octets |
|---|---|---|---|---|
| Message type | Message Type | M | V | 1 |
| Location Estimate | Geographic Location | C | TLV | 2-22 |
| Positioning Data | Positioning Data | O | TLV | 2-n |
| Deciphering Keys | Deciphering Keys | O | TLV | 17 |
| LCS Cause | LCS Cause | O | TLV | 3 |
| CGIList | List of CGIs | C | ??? | ??? |
| LACList | List of LACs | O | ??? | ??? |

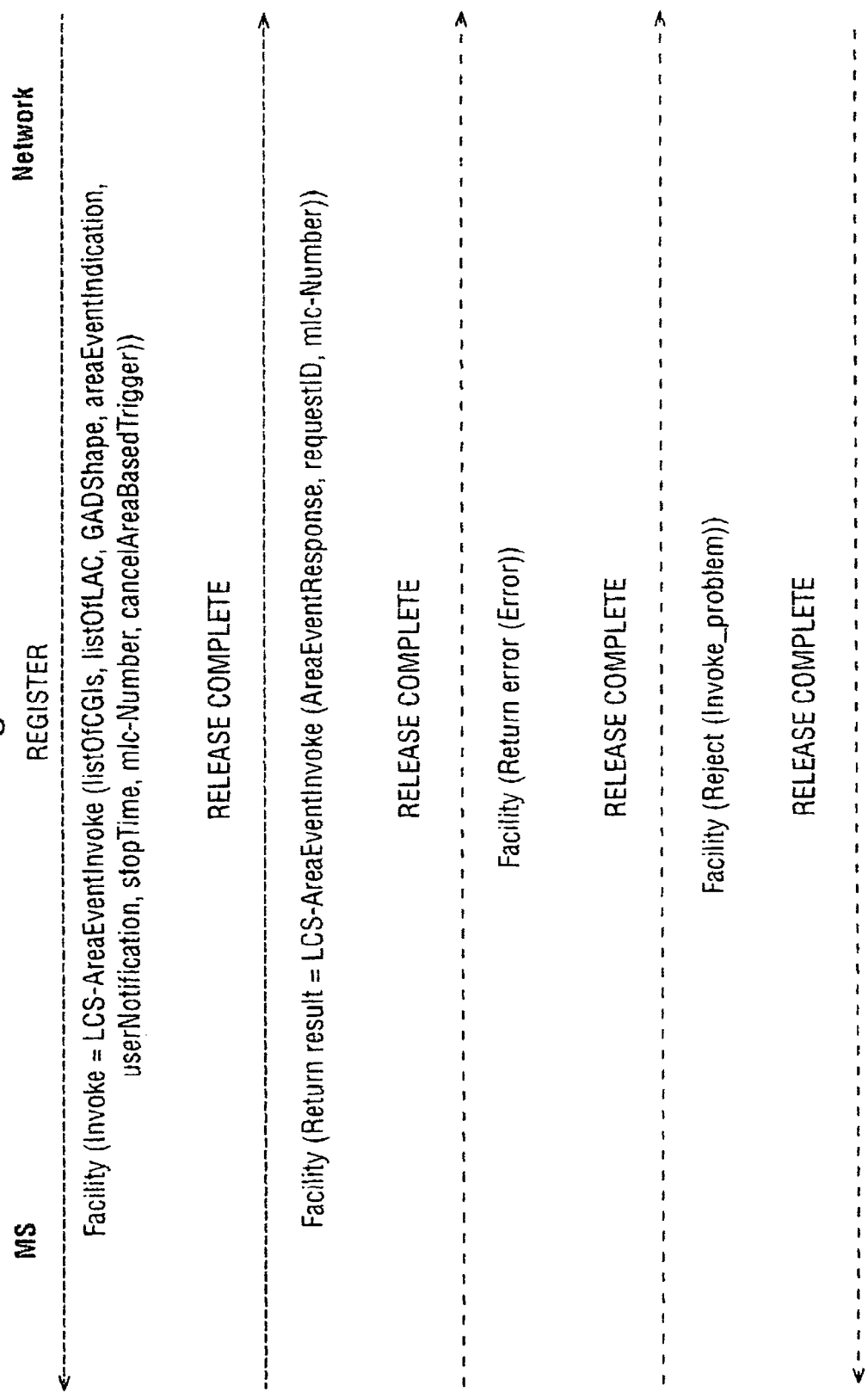

Fig. 10

| ProvideSubscriberLocation-Res ::= SEQUENCE { | | |
|---|---|---|
| locationEstimate | Ext-GeographicalInformation, | |
| ageOfLocationEstimate | [0] AgeOfLocationInformation | OPTIONAL, |
| extensionContainer | [1] ExtensionContainer | OPTIONAL, |
| ... , | | |
| add-LocationEstimate | [2] Add-GeographicalInformation | OPTIONAL, |
| deferredmt-lrResponseIndicator | [3] NULL | OPTIONAL, |
| requestID | [4] RequestID | OPTIONAL, |
| areaEventResult | [5] AreaEventResult | OPTIONAL } |

| AreaEventResult ::= ENUMERATED { | |
|---|---|
| registerdWaiting | (0), |
| triggerSatisfied | (1), |
| maxNumberReached | (2), |
| rejectedME | (3), |
| rejectedUser | (4), |
| ... } | |

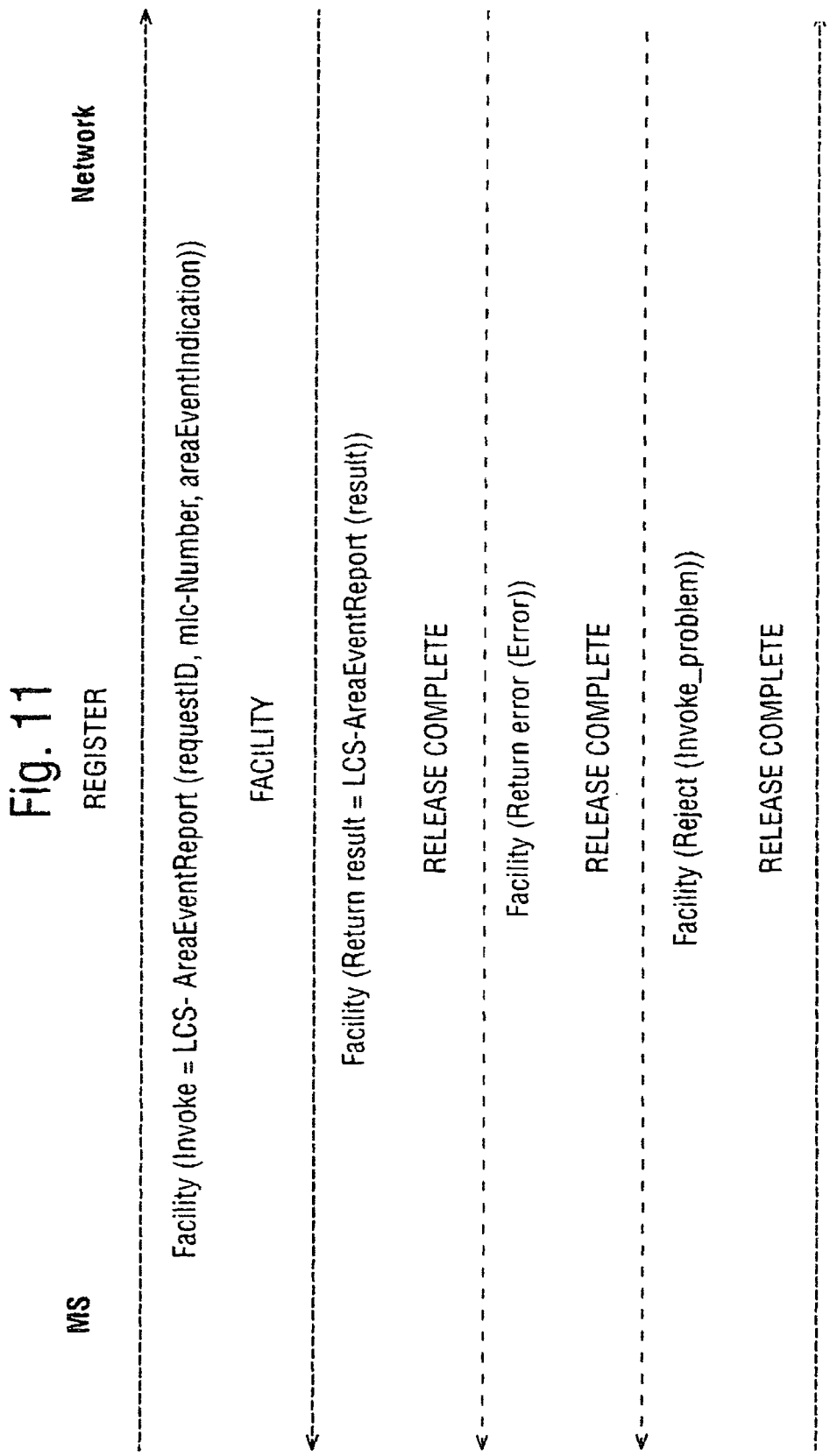

Fig. 12

```
SubscriberLocationReport-Arg ::= SEQUENCE { lcs-Event              LCS-Event,
    lcs-ClientID           LCS-ClientID,
    lcsLocationInfo        LCSLocationInfo,
    msisdn                 [0] ISDN-AddressString            OPTIONAL,
    imsi                   [1] IMSI                          OPTIONAL,
    imei                   [2] IMEI                          OPTIONAL,
    na-ESRD                [3] ISDN-AddressString            OPTIONAL,
    na-ESRK                [4] ISDN-AddressString            OPTIONAL,
    locationEstimate       [5] Ext-GeographicalInformation   OPTIONAL,
    ageOfLocationEstimate  [6] AgeOfLocationInformation      OPTIONAL,
    extensionContainer     [7] ExtensionContainer            OPTIONAL,
    ... ,
    add-LocationEstimate   [8] Add-GeographicalInformation   OPTIONAL,
    deferredmt-lrData      [9] Deferredmt-lrData             OPTIONAL,
    requestID              [10] RequestID                    OPTIONAL }
```

```
LCS-Event ::= ENUMERATED {
emergencyCallOrigination (0),
emergencyCallRelease (1),
mo-lr (2),
... ,
deferredmt-lrResponse (3), areaEventEnter (4), areaEventLeave (5) }
```

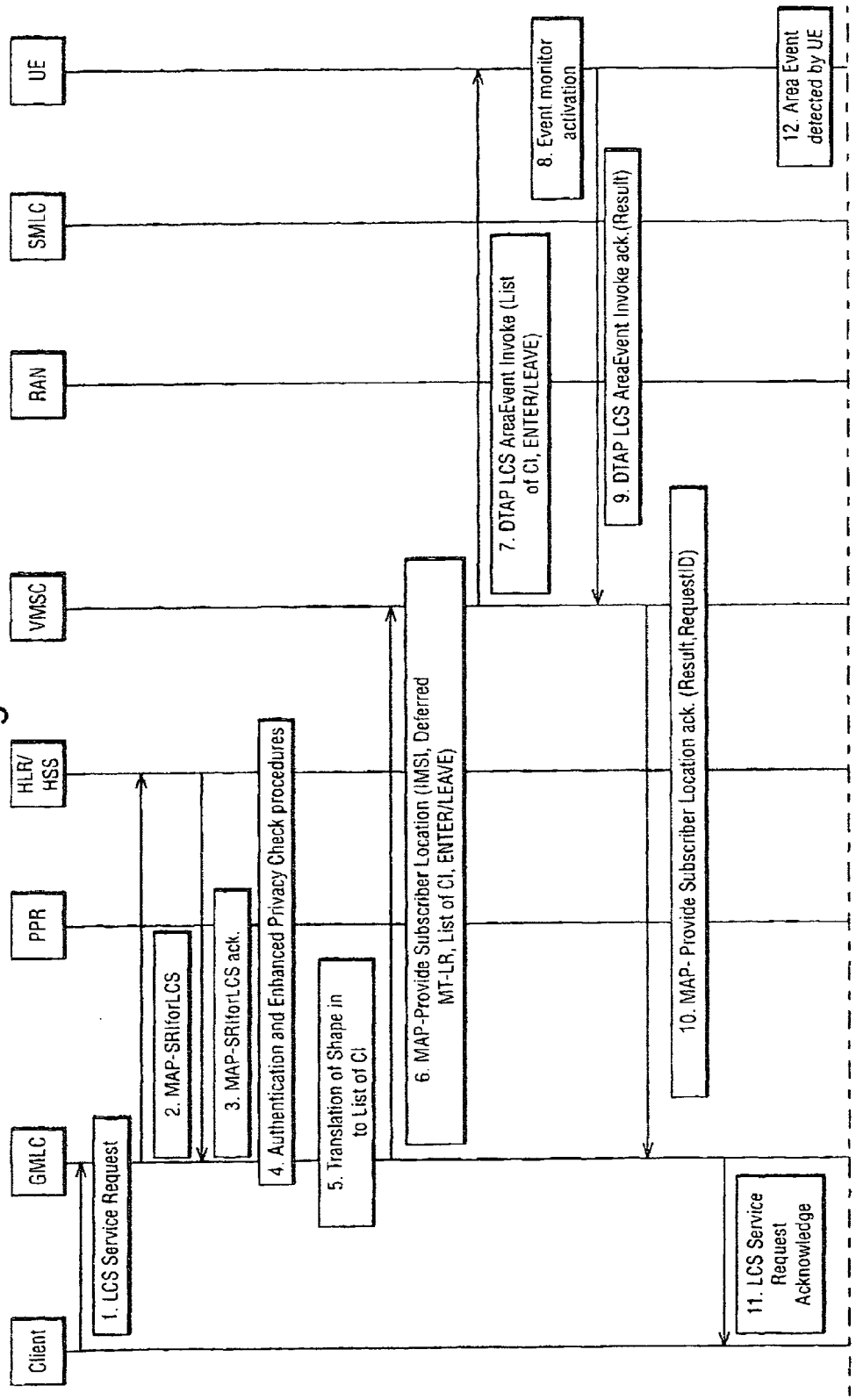

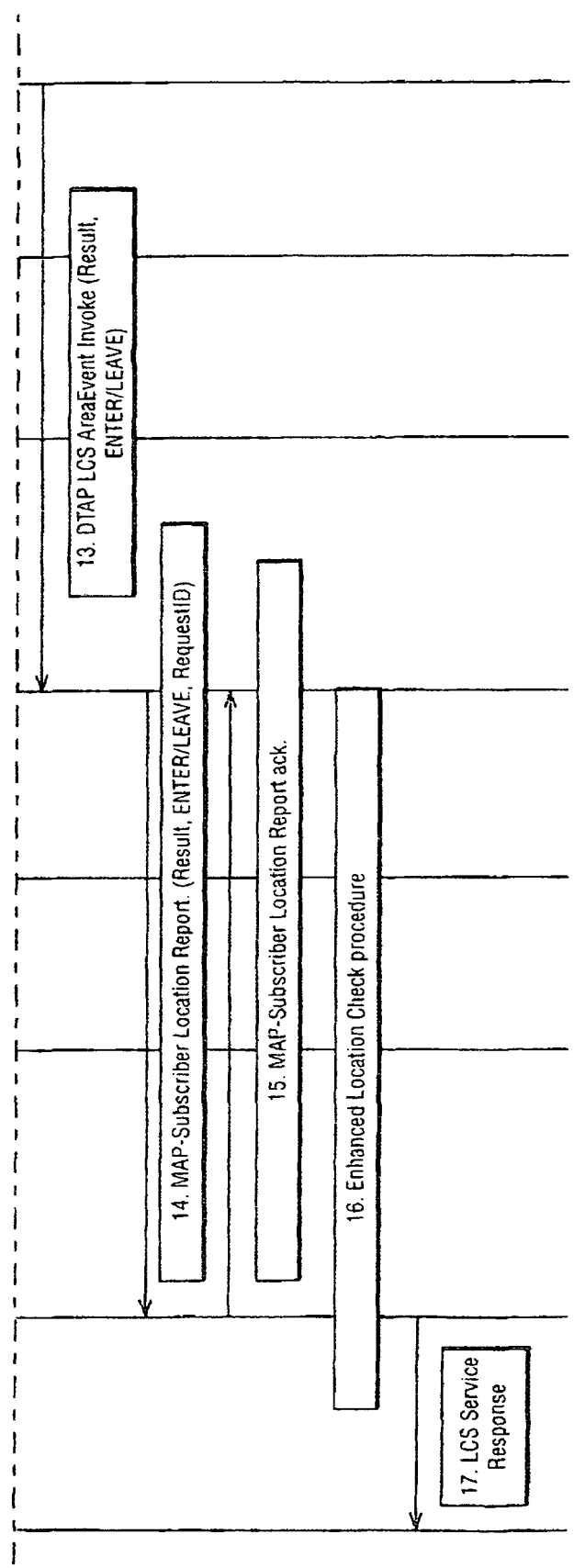
Fig. 13 (contd)

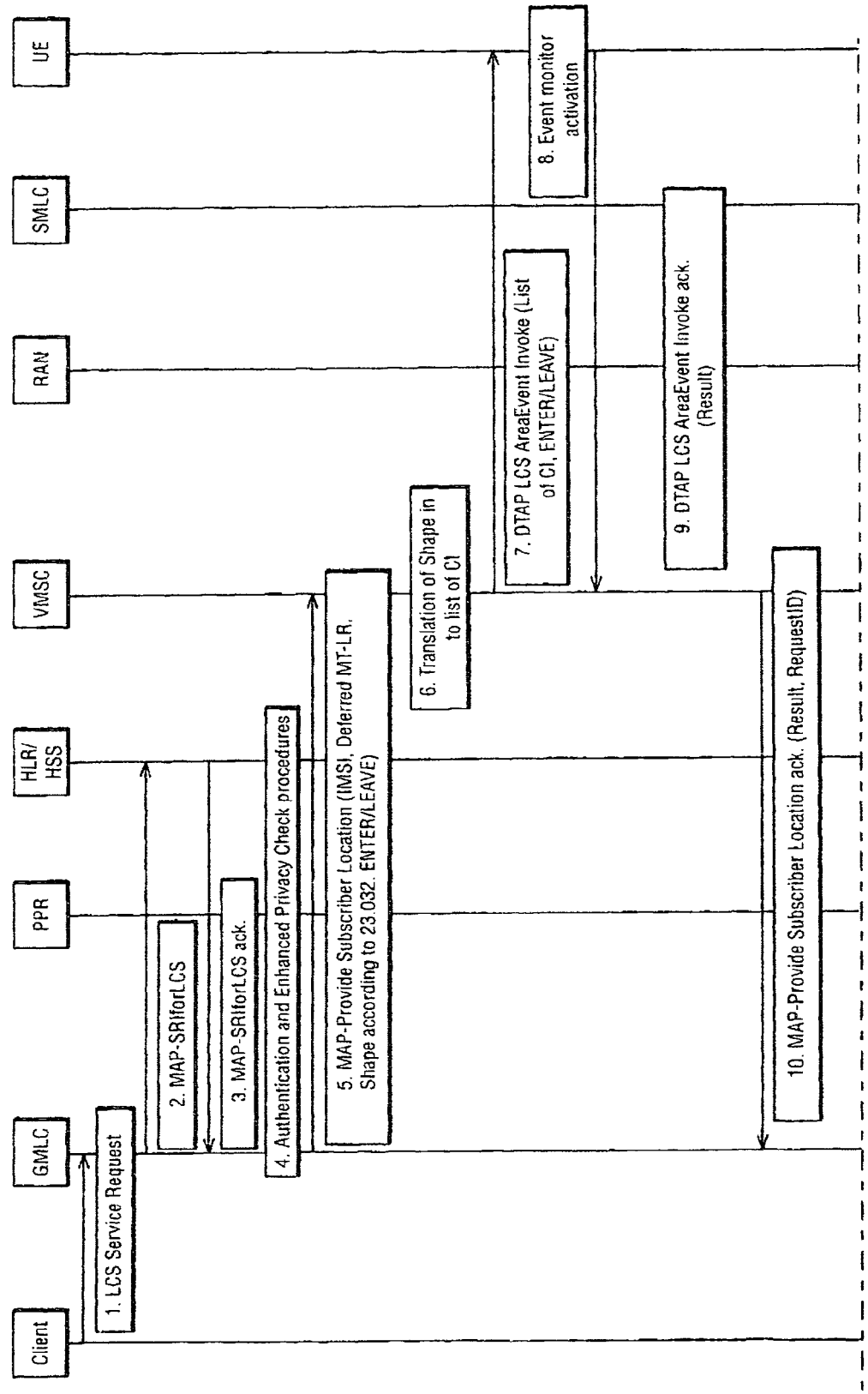

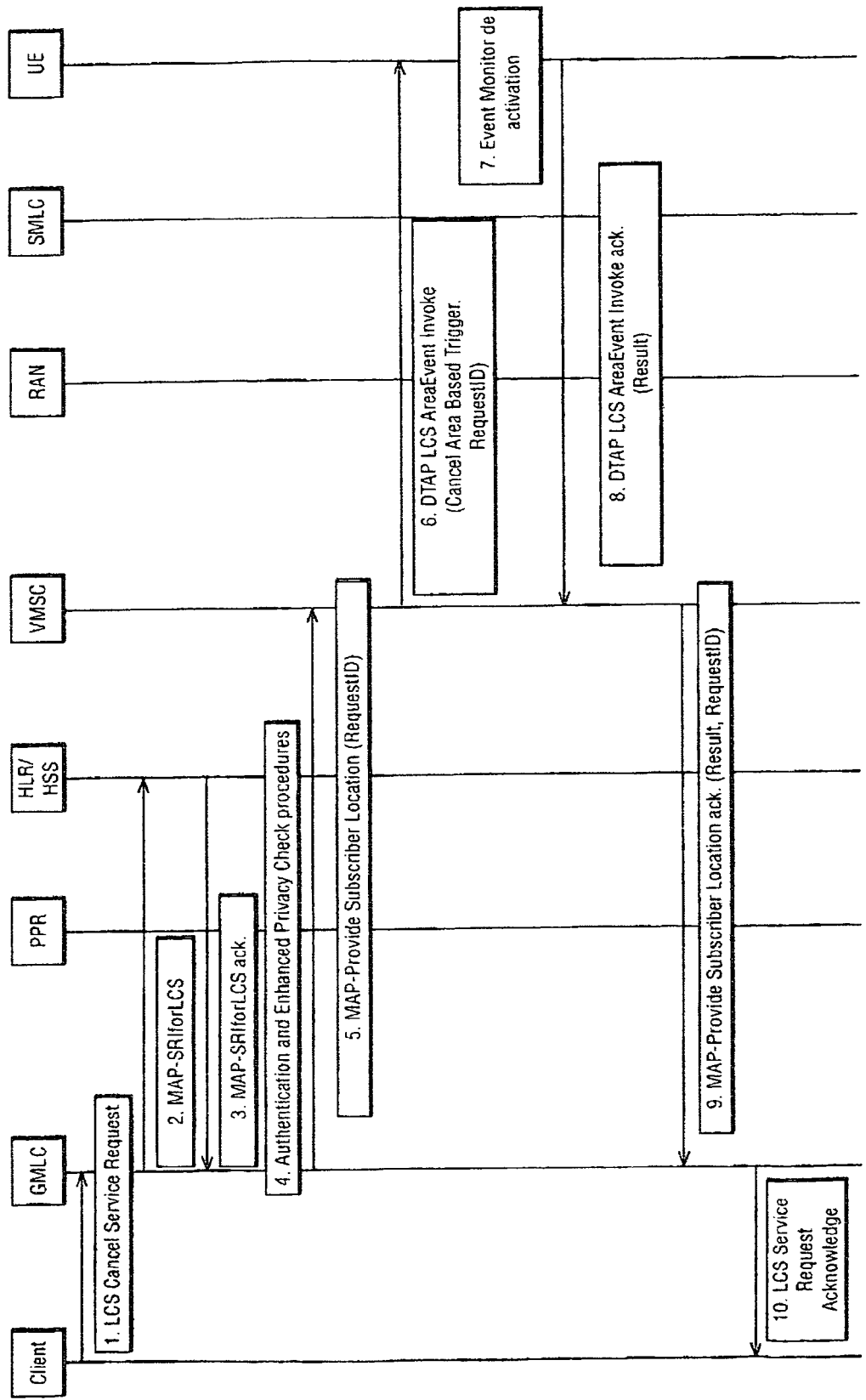

PROVISION OF INFORMATION REGARDING A MOBILE STATION

FIELD OF THE INVENTION

The present invention relates to provision of information regarding a mobile station adapted for wireless communication services via a communication system, and in particular, to signalling of information that is generated based on the geographical location of the mobile station in response to a predetermined event such as entering or leaving a geographical area.

BACKGROUND OF THE INVENTION

Communication systems providing users thereof with a possibility for wireless communication are known. A typical example of such systems is a cellular or mobile communications system. The cellular communication system is a communication system that is based on use of radio access entities and/or wireless service areas. The access entities are often referred to as cells. A characteristic feature of the cellular systems is that they provide mobility for the users of the communication system. Hence they are often referred to as mobile communication systems.

Non-limiting examples of cellular communications systems include standards such as the GSM (Global System for Mobile communications) or various GSM based systems (such as GPRS: General Packet Radio Service), AMPS (American Mobile Phone System), DAMPS (Digital AMPS), WCDMA (Wideband Code Division Multiple Access), TDMA/CDMA (Time Division Multiple Access/Code Division Multiple Access) in UMTS (Universal Mobile Telecommunications System), IMT 2000, i-Phone and so on.

In a cellular system, a base transceiver station (BTS) provides a wireless communication facility that serves mobile stations (MS) or similar wireless user equipment (UE) via an air or radio interface within the coverage area of the cell. As the approximate size and the shape of the cell is known, it is possible to associate the cell to a geographical area. The size and shape of the cells may vary from cell to cell. Several cells may also be grouped together to form a larger service area. A base station may provide more than one cell.

Each of the cells can be controlled by an appropriate controller apparatus. For example, in the WCDMA radio access network the base station (which may be referred to as Node B) is connected to and controlled by the radio network controller (RNC). In the GSM radio network the base station may be connected to and controlled by a base station controller (BSC) of a base station subsystem (BSS). The BSC/RNC may be then connected to and controlled by a mobile switching center (MSC). Other controller nodes may also be provided, such as a serving GPRS support node (SGSN). The MSCs of a cellular network are typically interconnected and there may be one or more gateway nodes connecting the cellular network e.g. to a public switched telephone network (PSTN) and other telecommunication networks such as to the Internet and/or other packet switched networks.

The cellular network apparatus and/or the mobile station can be employed for provision of location information of the mobile station and thus the user thereof. In an application the cells or similar geographically limited service areas and associated controller nodes facilitate the cellular communications system to produce at least a rough location information estimate concerning the current geographical location of a particular mobile station. If the location of the cell is known, it is possible to conclude therefrom the geographical area in which a given mobile station communicating in said cell is likely to be at a given moment. This information may be provided also when the mobile station is located within the coverage area of a visited or "foreign" network. The visited network may be capable of transmitting location information of the mobile station back to the home network, e.g. to support location services or for the purposes of call routing and charging.

A mobile station itself may also be provided with appropriate equipment to provide information on which the positioning of the mobile station can be based on. The mobile station may communicate the information via the base to an appropriate network element that may use the information in a predefined manner.

More accurate location information may be obtained based on various location estimation methods, e.g. based range difference (RD) measurements or by means of an external location information service, for example a satellite based system such as those referenced by the names 'Global Positioning System' (GPS) or 'Galileo'. The measurements may be accomplished at the mobile station or by a number base stations.

The location information is typically provided by means of a location service functionality associated with the communication system. The location service functionality may be provided by a separate network element such as a location server which receives location information from one or more sources. If the service entity receives only an indication of the present cell (e.g. the cell ID), and no further computations and/or approximations are made, this would give the location to an accuracy of one cell, i.e. it would indicate that the mobile station is (or at least was) within the coverage area of a certain cell.

3GPP specification 3GTS 23.032 v4.0-0 titled 'Universal Geographical Area Description' presents a possibility for defining/representing geographical areas. The definition is based on shape and one or several location points. This concept may be referred to as DEfined Geographical Areas (DEGA). Based on this concept the mobile station measures its position. The station is adapted to compare the determined position to a defined geographical area. If it is determined that the mobile station has entered or left the defined area, the mobile station sends a notification thereof to the network.

Information that is required for the area definition is stored at the mobile station. The DEGA information may be broadcast via the base stations to the mobile stations. The DEGA information may also be stored beforehand in a SIM/USIM (subscriber identity module/UMTS SIM) of the mobile station. The DEGA information typically consists of one or several geographical points and shapes as defined by the 3GTS 23.032 specification. The DEGA information may also include a unique name, identification number of other identifier for the defined area in question.

A location-based application may be interested in when a specific subscriber is entering or leaving a geographical area. Different kinds of services are possible if such a mechanism would be in place. It might be useful for various commercial and non-commercial services and similar applications to have information if a mobile station is located within a particular defined geographical area. In some application it might be useful for the network element to be able accomplish the operation for obtaining location information only if the mobile station is detected as being in a selected part of the communication system. For example, various organisations or even individuals may want to send information and/or offer services to a mobile station only in a particular defined geographic area and/or to a certain type of subscriber in a particular geographical area. More detailed examples of these include location based push services like advertisements and parents monitoring the whereabouts of their children. It may be enough if the party requesting for information receives confirmation whether a mobile station is within the defined are or not. It would also be advantageous if the location information could be provided without causing excessive load into the resources of the communication network.

The inventors are not aware of any solutions to the above that could be implemented based on the existing standards and in which there is not a need for proprietary solutions utilizing some kind of polling schemes and/or heuristics have been proposed. All proposed solutions are based on polling mechanisms and/or they are introducing requirements for new architectural aspects to the communication standards. The earlier proposals utilize polling mechanisms and heuristics to decrease the polling intervals, as the subscriber is getting closer to the area of interest. Recently a user equipment (UE) based solution has been proposed in the 3GPP. However, this solution requires modification and/or introduction of the application running in the Subscriber Identity Module (SIM) of the mobile station and communication utilizing the SMS service. The proposal also requires introduction of new architecture in the LCS. The inventors have also found that the prior art solutions based on polling and heuristics may be too heavy (both computationally and from the point of view of the load caused to the signalling channels), especially in occasions where nothing else than information whether a specific mobile station is located or not within a specific area is required.

SUMMARY OF THE INVENTION

It is an aim of the embodiments of the present invention to address one or several of the shortcomings of the prior art solutions.

According to one aspect of the present invention, there is provided a method of providing information regarding a mobile station adapted for communication via a communication system, comprising:
  receiving an area event notification request at a location service entity provided in association with the communication system, the area event notification request containing information associated with the identity of the mobile station and an area of interest;
  activating monitoring for an event indicative of a change in the presence status of the mobile station relative to said area of interest; and
  signalling a notification in response to detection of such event.

According to one aspect of the present invention, there is provided an arrangement in a communication system, comprising:
  mobile stations adapted for wireless communication with base stations of the communication system;
  a location service entity adapted for receiving an area event notification request containing information associated with the identity of a target mobile station and an area of interest;
  monitoring means for monitoring, in response to receiving said request, for an event indicative of a change in the presence status of the target mobile station relative to said area of interest and for signalling a notification in response to detection of such event.

According to one aspect of the present invention, there is provided an area event notification request for use in a communication system wherein mobile stations adapted for wireless communication with base stations of the communication system, the request being for activating monitoring for an event indicative of a change in the presence status of a target mobile station relative to an area of interest and containing information associated with the identity of the target mobile station and the area of interest.

In a more specific form, the monitoring is activated at the mobile station.

The monitoring may be based on the identity of at least one cell of the communication system selected based on said information of the area of interest, on at least one location area determined based on said information of the area of interest, on at least one routing area determined based on said information of the area of interest, and/or on at least one service area determined based on said information of the area of interest.

The area of interest may be defined by means of a shape of the area.

The request may contain further information regarding the event to reported, the further information defining whether entering or leaving of the area of interest shall be reported.

The request for area event notifications may be cancelled.

The embodiments of the invention may provide a system and method by means of which it is possible to provide information regarding the presence status of a mobile station relative a geographical area of interest.

BRIEF DESCRIPTION OF DRAWINGS

For better understanding of the present invention, reference will now be made by way of example to the accompanying drawings in which:

FIGS. 5 to 12 relate to possible messages transmitted in various steps of FIG. 4;

FIGS. 13 and 14 are signalling charts illustrating the operation in accordance with embodiments that are alternatives to that of FIG. 4; and FIG. 15 is a signalling chart illustrating cancellation of an activated monitoring procedure.

DESCRIPTION OF PREFERRED EMBODIMENTS OF THE INVENTION

Figure 1:
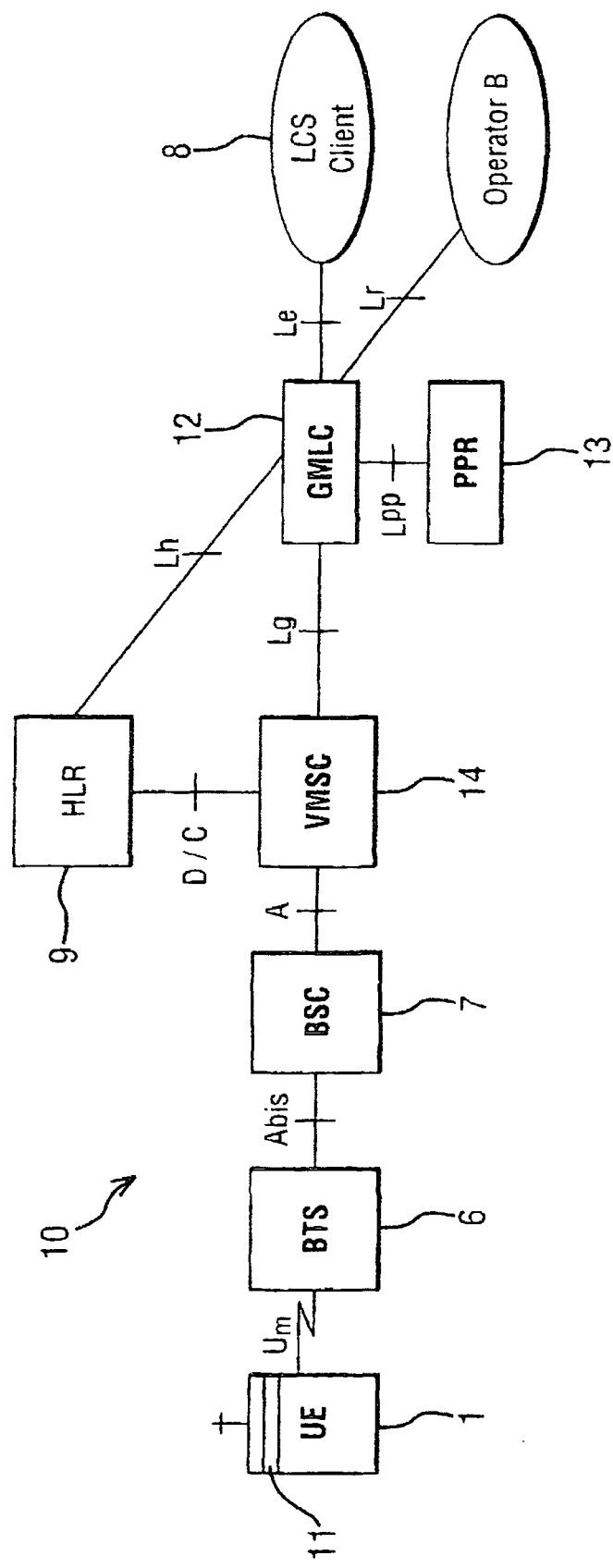
FIG. 1 shows some of the elements of a cellular communication system in which the embodiments of the present invention may be implemented.
Figure 2:
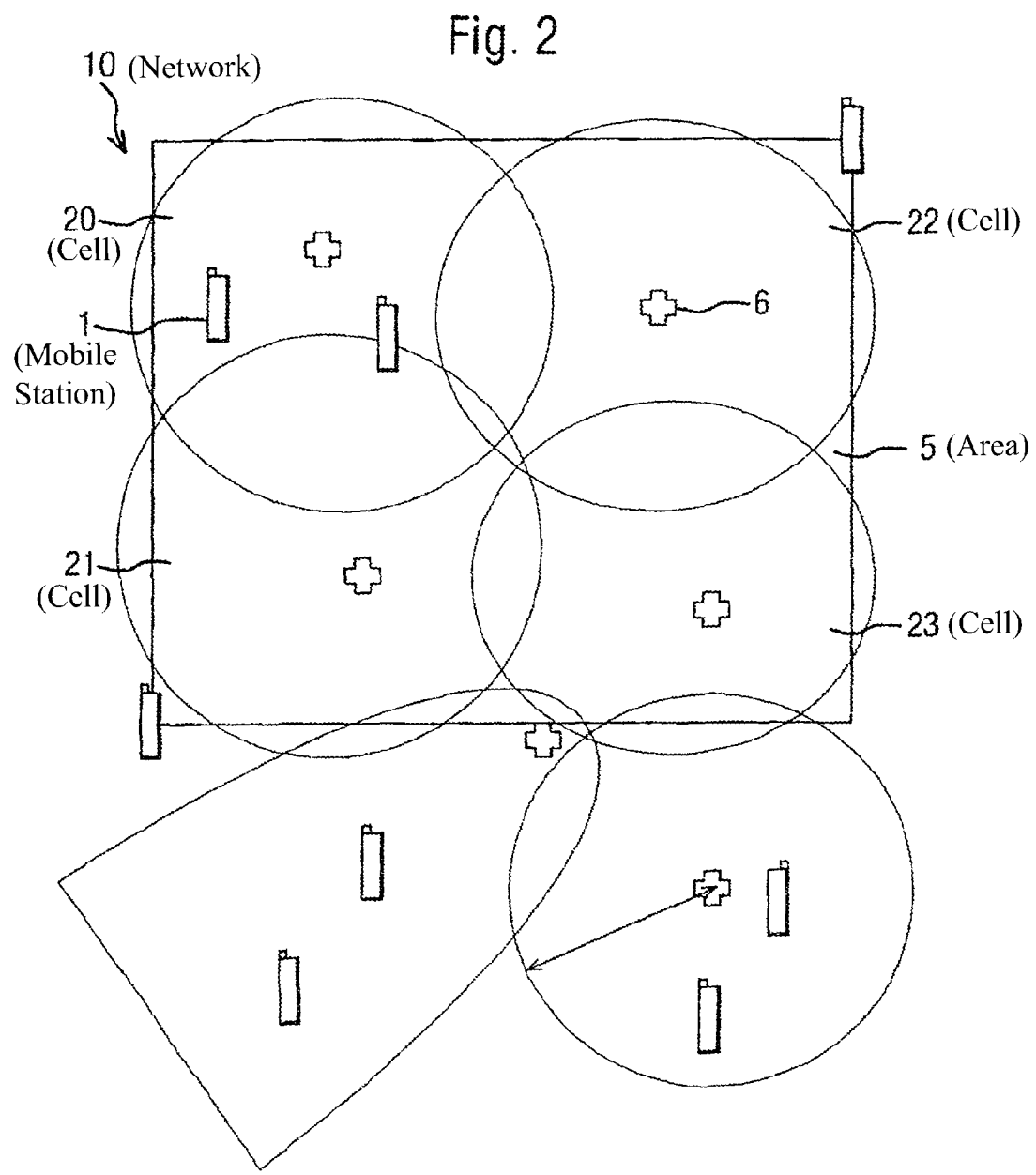
FIG. 2 shows a defined area covered by cells.

Reference is made first to FIGS. 1 and 2. FIG. 1 shows a part of a cellular public land mobile network (PLMN) 10 in which the embodiments of the present invention may be employed. FIG. 2 shows schematically an area covered by a plurality of access entities 20 to 23, i.e. cells of the cellular communication system of FIG. 1.

Each cell has associated therewith a base station 6. The $3^{rd}$ generation telecommunications systems the base station may be referred to as node B. The term base station will be used in this document to encompass all elements which transmit to and/or receive signals from mobile stations 1 or the like via the air interface. Likewise, the wireless station or mobile stations are able to transmit signals to and receive signals from the respective base station via wireless communication with the base stations.

As shown by FIG. 2, a base station may provide differently shaped radio coverage, such as an omni-directional coverage area or a sector beam provided with a directional or sector antenna. The sector base station may use e.g. three 120° directional antennae whereby three radio coverage areas are provided, or four 90° directional antennas providing four radio coverage areas and so on, or any combinations of different radio coverage beam widths. It should be appreciated that the size and shape of the cells or other access entities is typically not as regular as what is shown in FIG. 2, but will depend on the conditions in the area and the communication application.

The mobile stations are able to move within the cell and also from one cell coverage area to another cell coverage area. The location of a mobile station may thus vary in time as the mobile station is free to move within the service area of the communication system.

The user equipment such as the mobile station 1 may be provided with an appropriate terminal equipment 11 for the provision of location information, such as a processor unit.

Some of the elements of a PLMN network system will now be discussed in more detail before explaining the basic concept of the present invention. The mobile stations or user equipment 1 is arranged to communicate via the air interface with a respective base station 6. Each base station is controlled by respective controller. In FIG. 1 this is provided by means of a base station controller (BSC) 7. The third generation (3G) systems refer to a radio network controller RNC for similar functionality. The controller 7 and the base station 6 may sometimes be referred to by term such as the radio network subsystem RNS or UMTS terrestrial radio access network UTRAN 10. The radio network subsystem 10 may be connected to a controller node such as a MSC (mobile switching centre) or a SGSN (serving GPRS support node) 14. The MSC 14 provides various control functions such as keeps track of the mobile station's location for the purposes of call routing and performs security functions and access control. Each subscriber is typically registered in a register functionality such as a Home Location Register (HLR) 9 or Home Subscriber Server (HSS). The MSC or similar may communicated with the register entity via a suitable interface arrangement. In some application the MSC and the HLR are an integrated entity. The MSC 14 may be connected to further nodes such as a gateway (not shown for clarity). The entities of a PLMN are well known by the skilled person, and are thus not explained in any greater detail.

The PLMN system may be connected to various other communication networks, such as to another PLMN, to a public switched telephone network (PSTN) or to a data networks such as the Internet. This is designated by the operator B in FIG. 1. The various networks may be interconnected to each other via appropriate interfaces and/or gateways. These are known, and do not form an essential part of the invention, and are therefore not shown for clarity.

The geographical location of the base stations is known. The location of the base station may defined, for example, in X and Y co-ordinates or in latitudes and longitudes. It is also possible to define the location of the mobile station in vertical directions. For example, Z co-ordinate may be used when providing the location information.

FIG. 1 also shows a location services (LCS) node 12 providing location services for different applications or clients 8. In general terms, the LCS node can be defined as a function or entity capable of providing information concerning the geographical location of a mobile station. In FIG. 1 the node 12 is shown to comprise a gateway mobile location center (GMLC) provided in the core network side of the communications system 10. It shall be appreciated that other elements than the shown GMLC entity may provide the active LCS element. It shall also be appreciated that a communication system may comprise more than one location service element (e.g. a number of location server). Each of the location service elements may have an individual address or other identifier so that the other elements of the system may communicate thereto. It should be appreciated that the elements of the location service functionality may be implemented anywhere in the telecommunications system and that the actual location service implementation may be distributed between several elements of the system. In addition, more than one location service may associate with a telecommunication system, e.g. when two competing service providers have location service apparatus of their own. A more detailed description of a possible location server can be found, for example, from ETSI (European telecommunications Standards Institute) technical specification "Location Services" 3GPP specifications 3GTS23.171 or 23.271. These documents are incorporated herein by reference.

The location service node 12 of FIG. 1 is arranged to receive predefined information concerning the location of the mobile stations from the radio access network via MSC and/or SGSN 14. The location server 12 may be arranged to process information received from the network side and/or some other predefined parameters and/or to compute by processor means appropriate calculations for determining and outputting information based on the geographical location of the mobile stations.

The location server node 12 may provide location information to a client 8. The client 8 is a logical functional entity that makes a request to the GMLC node 12 for information that concerns one or more of the mobile stations of the cellular system. The LCS client 8 may be an entity that is external to the PLMN. The client may also be an internal client (ILCS) i.e. reside in any entity (including a mobile station) within the PLMN. The client is entitled to receive at least some degree of information concerning the location (or location history) of the mobile station 1.

The location server node 12 responds to a location request from a properly authorised location client 8 with information concerning mobile stations if authentication and other requirements are satisfied. The location Server 12 may thus provide the client 8, on request, the current or most recent geographic location (if available) of the mobile stations within the defined area or, if the location procedure fails, an error indication and optionally the reason for the failure.

The particular requirements and characteristics of a location client 8 are preferably known to the server 12 by its location client subscription profile. The particular client related restrictions may also be detailed in the subscription profile of the client. The location Server 12 may also enable a network operator to charge the client 8 for the location features that the network operator provides.

The location server node 12 may consists of a number of location service components and bearers needed to serve the location clients 8. The location server node 12 may provide a platform which will enable the support of location based services in parallel with other telecommunication services such as speech, data, messaging, other teleservices, user applications and supplementary services.

FIG. 1 shows also a privacy profile register (PPR) 13 for storing privacy information of the target mobile user equipment. The PPR may also be used for functions such as executing privacy checks and sending of the privacy check results to other network elements, e.g. on the Lpp interface. PPR may be formed by means of a standalone network entity or the PPR functionality may be integrated in the home-GMLC of the target mobile station.

The embodiments of the present invention aim to provide a solution wherein the presence status of a subscriber within an area of interest 5 can be monitored. FIG. 2 shows for clarity reasons that the area of interest 5 has a rectangular shape. However, it shall be appreciated that the area of interest may have any appropriate shape such as ellipsoidal, polygonal or circular shape. The area may also be defined e.g. as an area within a defined radius or distance from a certain point (e.g. base station location or any other location), name of an area (e.g. name of a town, village or an organisation within a predefined area), by co-ordinates or latitudes and longitudes and so on. The area definition may also comprise an altitude parameter.

The following will describe in more detail a possibility to employ the already existing mechanisms so that an area related event trigger the can be provided within the existing architectural framework, such as in the framework specified in 3GPP LCS specifications without adding any significant signalling load to the network.

Figure 3:
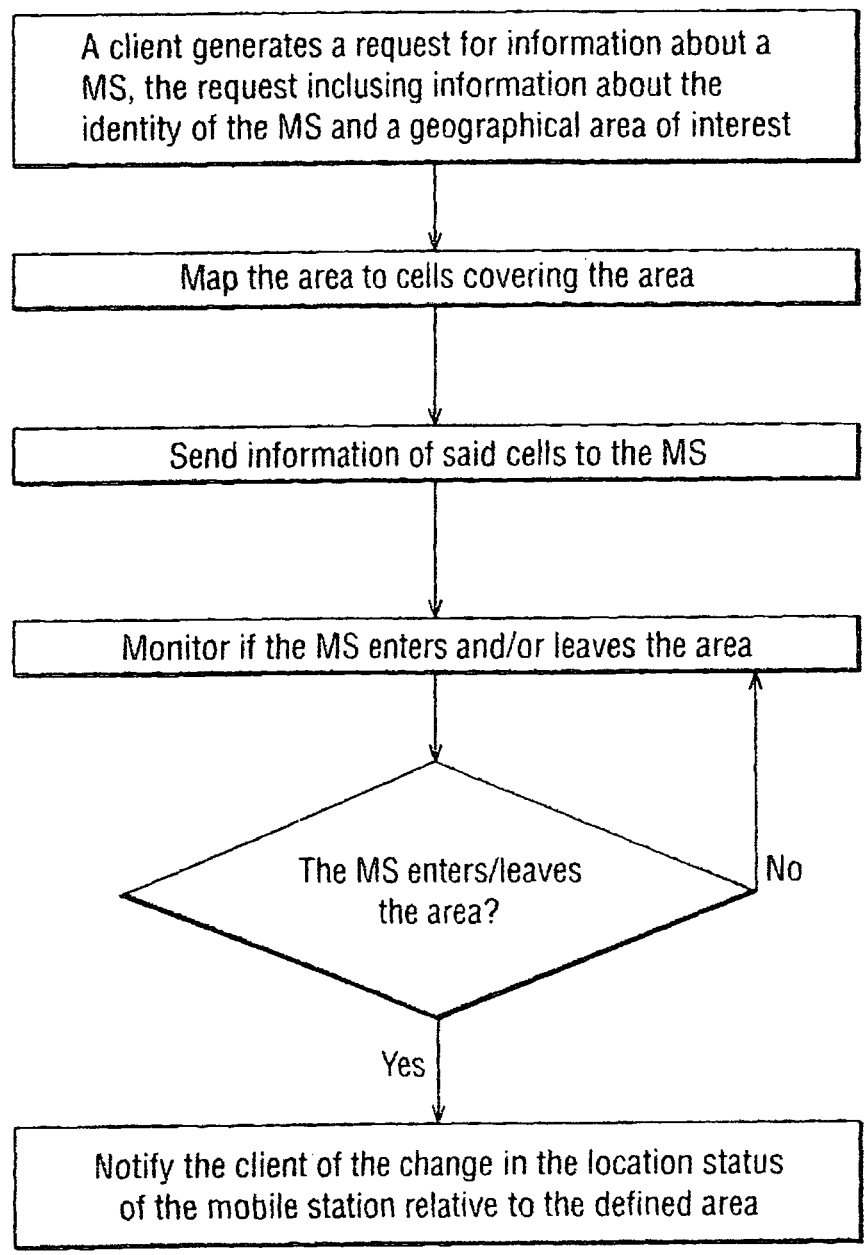
FIG. 3 is a flowchart illustrating the operation in accordance with an embodiment.

Turning now also to FIG. 3, the client 8, such as location-based service sends a location request towards the mobile network 10. The request indicates a geographical area of interest and the target subscriber. The definition of the geographical area may be based on as one or several geographical points and shapes, e.g. in the manner as defined by the referenced 3GTS23.032 specification. The request may also include an indication whether the client application is interested in when the subscriber is leaving or entering the area.

The geographical area 5 may be translated into a list of Cell Ids. In FIG. 2 the area 5 is shown to be covered by the cells 20 to 23. The IDs of these cells would thus be included in the list.

It shall be appreciated that other possibilities for the area definition may be used as well. For example, the area may be defined based on Cell Group Identities (CGI), Service Area identities (SAI), Location Areas Codes (LAC), Routing Area (RAC) and so on.

According to a possibility the GMLC 12 or another appropriate entity capable of providing a mapping function maps the defined area to cells belonging to the defined area. The mapping can be made, for example, by using existing lists of base station co-ordinates and their estimated ranges or by any other appropriate criteria. It is possible to define that only such cells are mapped that are entirely within the defined area. It may also be defined that it is enough is a predefined portion of the cell coverage area is within the defined area.

Figure 4:
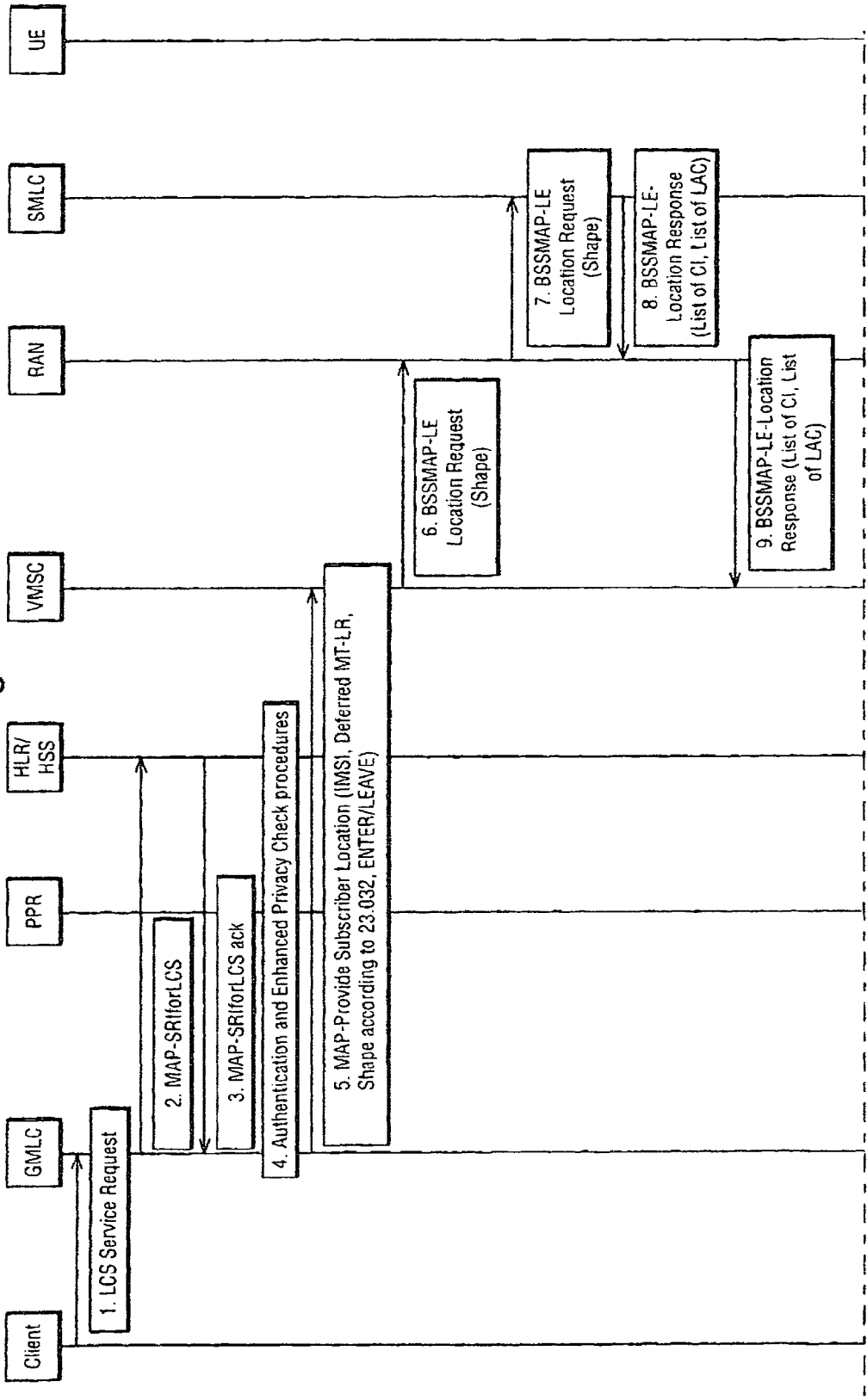
FIG. 4 is a signalling chart illustrating the operation in accordance with an embodiment of the present invention.
Figure 14:
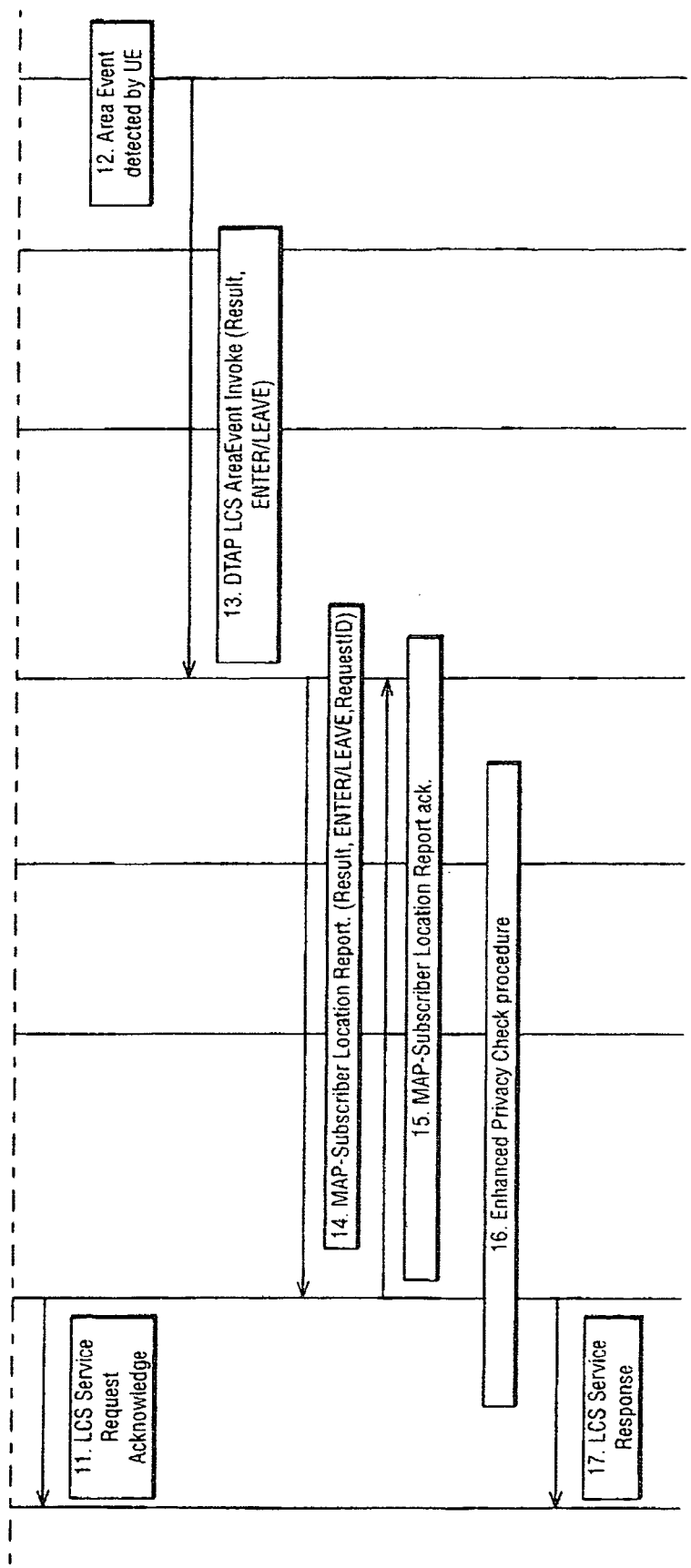

The mapping may be accomplished in any appropriate entity. FIGS. 4, 13 and 14 show three alternatives for the possible mapping entity and associated signalling.

The list of cells may then be sent to the mobile station 1 to register the "area event trigger". When the Cell ID is updated as the subscriber is moving the mobile station 1 will check the new Cell ID against the list. If there is match, the mobile station 1 sends a report back to the network. In FIG. 1 the message would be passed from the mobile station 1 to the GMLC 12.

The network then signals information to the client application 8 that the terminal has entered/left the area of interest. The response may simply inform that the mobile station is now within the area, or is outside the area.

Reference in now made to the signalling chart of FIG. 4 that shows in greater detail an embodiment. The operation is based on the use of the current LCS architecture. More particularly, FIG. 4 illustrates a procedure for a deferred location request where a location report is returned to the network by the mobile user equipment (UE) only following the occurrence of an area event. An area event occurs when the specified user equipment leaves or enters a predetermined geographical area. The area may be defined by means of any appropriate scheme, such as by means of one or more cells, a Routing Area (RA) or a Location Area or GAD shape.

In step 1 an LCS Client 8 sends provide subscriber location (PSL) request, and more particularly, a deferred location request message to the GLMC 12. The location request for triggered reporting contains the identity of the target user equipment, a shape conforming to TS 23.032 and an "area event" indication. The Deferred Location Request message may also contain more specific details about the event triggering the reporting. Steps 2 to 4 may be accomplished e.g. according to 3GPP technical specification TS 23.271 for an ordinary MT-LR.

In step 5 the GMLC sends a modified MAP-PROVIDE-SUBSCRIBER-LOCATION message to the VMSC/SGSN. The message contains identity of the target subscriber such as the IMSI (International Mobile Subscriber Identity) of the target subscriber or the MSISDN, the shape and the area event trigger. An example of the possible structure of the message is shown in FIG. 5.

To convert the geographical area specified by the shape the VMSC/SGSN may send a modified BSSMAP-LE Perform Location Request message to the BSC carrying the shape provided in the previous step, see step 6. The shape indication is shown as the lowest item the exemplifying message of FIG. 6.

The location type information element may have the form as shown in FIG. 7. The coding of the location information may be indicated as follows:
00000000 current geographic location
00000001 location assistance information for the target MS
00000010 deciphering keys for broadcast assistance data for the target MS
00000100 List of CGIs, LACs within the boundaries of the shape provided in the request all other values are reserved In step 7 the BSSMAP-LE message Perform Location Request sent by the VMSC/SGSN is forwarded by the BSC to the SMLC. The SMLC may then make the conversion of the shape into a list of CGIs and LACs and send a BSSMAP-LE Perform Location Response to the BSC, see step 8. The content of a possible response message is shown in detail in FIG. 8.

In step 9 the BSC receives the response from the SMLC and sends a response back to the MSC. The MSC may then send a new DTAP LCS-AreaEventInvoke message to the user equipment (UE) carrying the List of CGIs, SAIs, RACs or LACs and so on and the area event indication, see step 10. An exemplifying DTAP message is shown in detail FIG. 9.

If the DTAP LCS-AreaEventInvoke message is successfully received by the user equipment it stores the list of CGIs, and other possible information to the memory thereof and activates the monitoring, step 11. If so indicated in the DTAP LCS-AreaEventInvoke message, some text may be displayed to the subscriber by means of the display of the user equipment. The user may then accept or reject the Deferred Location Request.

Optionally, the network may specify a time when the area event trigger is cancelled even if the event has not occurred.

The message may also include the GMLC address so that when the event occurs the response can be routed to the correct GMLC even if the user equipment has moved to an area served by another MSC.

In the response to the DTAP LCS-AreaventInvoke message the user equipment may send at step 12 one of the following responses back to the VMSC/SGSN:
a) The request has successfully been set-up and is waiting for a trigger event.
b) Trigger already satisfied.
c) Maximum number of allowed Deferred Location Requests reached.
d) The request could not be set-up—User rejected request.
e) The request could not be set-up—ME rejected request.

The MSC receives the DTAP LCS-AreaEventInvoke message at step 13 from the user equipment UE and includes the result in the response to the provide subscriber location (PSL) request. A possible response is shown in FIG. 10.

If the Deferred Location Request was successfully registered with the UE this is returned at step 14 to the LCS Client, otherwise an error is returned.

When the UE performs a cell handover the monitoring entity (ME) shall check the details of the new serving cell, including the cell ID, step 15. If the user equipment comprises the monitoring entity, the area event monitoring functionality of the user equipment (UE) may compare the current cell ID or similar against one or more, target cell Ids in the list received from the network.

When the event occurs, depending upon the LDR requirement, one of the two following responses may be generated:
a) An area event LCS report indicating a positive match with the target cells, i.e. the subscriber is ENTERing the area; or
b) An area event LCS report indicating a negative match with the target cells, i.e. the subscriber is LEAVEing the area.

A detected change in the cell ID or cell group ID, location area code (LAC) or Routing area code may trigger a more accurate positioning if so supported by the UE. The calculated position is compared to the shape sent in sep 10.

The area event monitoring application may then disable itself and a DTAP LCS-AreaEventReport is sent to the VMSC/SGSN, see step 16. The report may include the original LDR reference, the GMLC address, the time that the event occurred and the current serving cell ID. Information relating to the area event or UE status may optionally be included in this report. An exemplifying area event report is shown in FIG. 11.

When the VMSC/SGSN receives the DTAP LCS-AreaEventReport it may generate a MAP-SUBSCRIBER-LOCATION-REPORT message and send it to the GMLC, as indicated in the DTAP message. A possibility for this report is shown in FIG. 12.

In step 18 the GMLC acknowledges the receipt of the MAP-SUBSCRIBER-LOCATION-REPORT message. The privacy check of step 19 may be accomplished according to TS 23.271 for an ordinary MT-LR. The GMLC then sends the location report to the LCS Client indicating whether the subscriber has entered or left the area of interest, step 20.

FIGS. 13 and 14 correspond to the procedure of FIG. 4, expect with regard to the element where the mapping takes place. In FIG. 4 the mapping of the Cell IDs is performed in the servicing mobile location center (SMLC), see step 8. However, this may not be appropriate in all instances. For example, if a request sent to the SMLC is sent to a SMLC associated with the RNC/BSC where the UE is currently located, this SMLC might not necessarily have the information for the cells of interest. This may be so since the SMLC may only have information of the area it is serving. The area supplied by the requesting application may be located in some other part of the network, and this may be hidden from the SMLC.

In FIG. 13 the mapping is performed at the GMLC, see step 5. Use of the GMLC for the mapping avoid the above mentioned problem associated with the SMLC, and thus this is the preferred solution at the present. In this case the PSL needs to be modified to carry the identity lists.

In FIG. 14 the mapping is performed in the Visited mobile switching centre (VMSC)/SGSN, see step 6.

The operation of FIGS. 13 and 14 is otherwise analogous to that of FIG. 4, and therefore the explanation thereof will not be repeated.

FIG. 15 illustrates the procedures for cancelling a Deferred Location Request where the Location Report is returned to the network by the user equipment following the occurrence of an Area Event. In step 1 the LCS Client requests the cancellation of a previously requested Deferred Location Request. The cancellation may also be initiated by the GMLC itself for some reasons. For example, implementation dependent timer in the GMLC has expired, or the UE's privacy settings stored in the GMLC/PPR was changed and the Deferred Location Request is not allowed any more. The event type to cancel must be indicated in the Cancellation procedure. The cancellation may also be initiated by the user equipment. For example, implementation dependent timer in the UE expires, or a timer received from, the network expires.

In the next step the GMLC may make an SRIforLCS to the HLR of the subscriber to obtain the current VMSC as this might have changed since the Area Based trigger was registered with the UE. Steps 3 and 4 may be performed in accordance with the TS 23.271 for an ordinary MT-LR. The GMLC may indicate the cancellation request in the Provide Subscriber Location message toward the VMSC/SGSN, see step 5.

The MSC may then send a DTAP LCS-AreaEventInvoke message at step 6 to the UE carrying the RequestID and an indication that the corresponding Deferred Location Request is cancelled. The UE de-activates the monitoring and purges the corresponding list of CGIs, LACs and Shape, see step 7. The user equipment may respond with and result indication that the Deferred Location Request was successfully cancelled, step 8. The VMSC may then send at step 9 an acknowledgement to the GMLC indicating that the Deferred Location Request was successfully cancelled. The GMLC may then purge any data related to the cancelled Deferred Location Request and send an acknowledgement at step 10 to the LCS Client, if the cancellation procedure was initiated by the LCS Client as indicated in step 1.

In accordance with an embodiment, upon receipt of the request, the mobile station 1 may check whether it is in the defined geographical area or not, and send as an immediate response the result (i.e. in/out).

The existing LCS architecture may be used for the provision of the event based location area reporting. The monitoring functionality required on the mobile station side may be implemented in the terminal itself. Alternatively the required functionality may be provided by means of an auxiliary device associated with the mobile station. This could be an application running in the controller means of the mobile station or a server the mobile station may communicate with. It may be advantageous if the application does not run on the SIM (subscriber identity module) entity of the mobile station. This may enable solutions that are independent from the network operators.

The location procedure may be accomplished by the processor unit 11 of the mobile station.

If the UE supports some more accurate positioning technology the shape used in the request may be conveyed along with the Cells, Routing Area and Location Areas to the UE. In this case the Cells, Routing Area or Location Area trigger the actual positioning. The calculated position is compared to the submitted shape in the same ways as for plain Cells, Routing Area or Location Area.

Additionally, when the position of the UE is calculated for some other reason, the results may be compared against the submitted shape.

A mobile terminal changes cells quite often in idle mode and in connected mode in normal operation, and this may cause a large and unnecessary signalling load for the area event service. Two enhancements to embodiments of the invention are provided in order to minimise any such load.

One enhancement is that when the trigger fires, the context is purged as the event has occurred. In other words this type of trigger is not persistent but rather has a 'one-shot' nature. As a result, once a single area event report is returned by the mobile terminal, the location client would need to initiate a further area event request in order to receive further trigger information.

A second enhancement is to standardize area event reporting rules for a mobile or a SIM card. It should be noted that there are already standardized rules as to how the mobile changes cells in different states and what thresholds it applies. Even so, the mobile changes cells quite frequently, so the further rules discussed hereinbelow may be advantageously used to prevent the mobile or SIM card from reporting area changes too frequently.

Possible rules, which may be applied in combination or separately, are:
1. The mobile must not send any type of area event report more often than once in a given time period.
2. The mobile only sends a leaving area report if the mobile leaves the target area after it has been in the target area for a predetermined time, e.g. 1-2 minutes.
3. In case of permanent area event reporting the mobile does not send a repeated area arrival report or leaving area report for a cell belonging to the same service area more than once in a predetermined time interval e.g. every 10-15 minutes, 24 hours.
4. The mobile only sends an area arrival report (AAR) after it has been camping on, or using, the relevant cell for a predetermined time period, e.g. 2 minutes.
5. The mobile may only send the leaving area report if it has previously sent the AAR for the same area and only after it has been camping on (or using) the relevant cell for a predetermined time interval, e.g. 1-2 minutes.

The time periods as described above may be defined by the LCS client, which indicates the time period as a parameter in its location service request sent to the GMLC. The time periods described above may also be defined by the network operator as a general system parameter setting to be included in the corresponding signalling between GMLC, MSC/SGSN and the mobile or SIM card.

The mobile may normally be able to receive the cell IDs of several cells, which are adjacent to its serving cell. According to a further enhancement of the invention the mobile is adapted to recognize if one or more of the adjacent cells belong to the pre-defined area, and start monitoring cell changes actively. The service area definition may carry an indication that the mobile may modify its cell change criteria in such a situation. In one alternative of this enhancement, the cells that belong to a predefined area are made more "sticky" than normal cells, such that the mobile "prefers" such cells. In a second alternative of this enhancement the service area cells have a higher threshold such that the mobile "prefers" other cells in the cell border regions. In this case the predefined area is more limited and better defined than a "normal" service area. Such an enhancement would have to carefully introduced by an operator, as it may affect normal radio network planning and mobility management.

In a further enhancement to the present invention, the network may send an indication to the GMLC when an area event subscriber enters a PLMN so that this PLMN can upload the area definitions, cell lists, etc. that apply for this subscriber in the new PLMN. When the terminal is roaming it will detect when it enters a new PLMN and will therefore perform a normal location update. The VLR or SGSN in the visited PLMN will then send a location update to the HLR in the subscriber's home PLMN in a well know fashion. According to this enhancement the roaming subscriber subscribes to the LCS in general or to a specific area event service, which is applicable in the visited PLMN. The terminal, SIM card, the VLR or SGSN sends a trigger to the visited GMLC, V-GMLC, in the visited PLMN, V-PLMN, that the terminal of such a subscriber has entered the V-PLMN. The V-GMLC checks if there are some area events that are applicable for this subscriber and the V-GMLC requests (SMSC) VMSC/SGSN the corresponding cell lists to be sent to the mobile. In the case where an LCS client (or the subscriber itself) defines new areas in the visited network the V-GMLC may upload the corresponding cell list to the mobile. In the case that the SIM tool kit solution is used, the V-GMLC sends the cell lists to the home PLMN and home PLMN updates the cell lists in the mobile.

The mobile may be currently connected in a different network than the requested target area is. The current serving network may not be able to map the requested geographical area of another network into the list of that network's cells/LAs/RAs. An enhancement to the present invention provides a solution to this by the GMLC sending a request when the mobile is in the target PLMN. The GMLC could receive the target PLMN address or the country code/name from the LCS client. Another alternative is that the GMLC may find out itself the corresponding PLMN of the geographical area. Possible places where the request could be sent to are the HLR, MSC/VLR, SGSN, SIM card or the mobile. When the mobile enters the target PLMN, the HLR, MSC/VLR, SGSN, SIM card or mobile may send a response to the GMLC that the mobile has now entered the target PLMN.

In a further solution after obtaining the information on the target PLMN, the Home-GMLC may send an area event request to the target GMLC/SMLC which translates the geographical area in to a list of cells/LAs/RAs. The H-GMLC then forwards this received information to the mobile, SIM card or the visited MSC/SGSN. In this alternative the cells must be in the format of cell global identity (CGI), or the area information (cells/LAsRAs) must contain information that they are for a certain PLMN. In this way the Cell IDs, the LAIs or the RAIs from the target PLMN are not mixed up with the Cell Ids, LAIs or RAIs in the visited network.

A further enhancement for embodiments of the invention is now described, which enhancement may be considered a verification—or 'sanity' check—of the response from the terminal.

It is not possible to be 100% sure that the subscriber is in the area intended, as operators tune their networks on a daily basis. This means that a cell-ID may no longer correspond with the intended geographical area due to operator changes to the radio network after registration of the area trigger with the terminal and before the trigger has fired. With the enhancement described below the service provider can detect changes in the radio network configuration that impact on the area service quality, to be sure that the terminal is actually in the geographical area as intended.

Therefore, this enhancement proposes that before the service response indicating that a subscriber has entered or left a pre-defined geographical area is transmitted, the cell-ID returned by the terminal is verified by the translating entity (e.g. the SMLC, MSC/SGSN, or GMLC) to ensure that the cell is still within the intended geographical area. This may be achieved by comparing the current cell-IDs of the intended geographical area stored in the network with the cell-ID returned response from the terminal.

If the cell-ID is still associated with the intended area a normal response is sent to the LCS Client. Otherwise the network may either re-issue the deferred location request to the terminal with an updated cell list, or an error message may be returned to the LCS Client. In the case of an error message the LCS Client may re-issue the original location request and the updated cell-ID information may be provided to the terminal.

Another aspect of this enhancement is that the LCS client or the network, e.g. the GMLC, may cancel or update the predefined area definition in all mobiles subscribing to this service area if the network detects the error case described above. The area definition cancellation or update may be normally done in the background if the mobile has established another connection to the network. Alternatively the GMLC can request the MSC/SGSN to set up a dedicated (DTAP) signalling connection for this purpose.

The GMLC may also send, cancel or update the area definition in the mobile or in the mobile's SIM card by requesting the SMS centre to send such an SMS to the mobiles.

As an example, a certain geographical area—say a shopping centre—may be associated, for example, with cell-ID_1. Due to operator changes, cell-ID_1 is reallocated elsewhere in the network, and the shopping centre is now associated with cell-ID_8. Therefore the mobile needs to be updated to return responses relating to cell-ID_8, and any information returned in relation to cell-ID_1 is not relevant, as it does not relate to the shopping centre.

In addition to the cell ID based positioning, the location may be based on any appropriate technique, such as MO-LR (mobile station originated location request), mobile station based E-OTD (enhanced Observed time difference), GPS (Global Positioning System) or DGPS (differential GPS) and so on. The accurate location of the mobile stations may be estimated or calculated by using existing location methods.

In the preferred form a mechanism for registering an "area event trigger" is provided in the mobile user equipment 1. However, the area related event triggering may also be provided in the network side. Thus, although the above described a solution wherein the request message is signalled to the radio access network and further to the mobile station, the message may not be signalled to the mobile station, but the request is received and processed and the requested response information is generated by the elements of the network. The network based solution may be implemented e.g. such that the event is monitored and registered by the BSC.

In addition to the above referenced, the request message may contain various other information.

As shown by FIG. 2, it is possible that the cells do not provide a full coverage of the defined area 5. The completeness requirements for the coverage may be defined to fit the application, e.g. such that better coverage is required in tensely populated areas, e.g. in cities, than in rural areas. Of course, it may also happen that the cells are overlapping. In such instance it may be enough if the user equipment leaves one of the cells, or enters one of the cells.

According to a preferred embodiment the mobile station 1 is provided with a location determination unit 11. It should be appreciated that the mobile station may receive the location information from another source, such as from a SMLC that is implemented at the network side of the system.

It should also be appreciated that while in the above the exemplifying embodiments of the invention have described in the context of a WCDMA (Wideband Code Division Multiple Access) UMTS (Universal Mobile Telecommunications System) and/or a GPRS (General Packet radio Service), the embodiments of the present invention are also applicable to any other cellular communication system which deals with packet data, non-packet data, voice communication and so on.

It is also noted herein that while the above describes exemplifying embodiments of the invention, there are several variations and modifications which may be made to the disclosed solution without departing from the scope of the present invention as defined in the appended claims.

The invention claimed is:

1. A method, comprising:
   receiving an area event notification request from a client at a location service entity provided within a communication system, the area event notification request containing information of the identity of a mobile station and a geographical area of interest specified by a predefined shape;
   mapping the shape into a list of a plurality of Cell Group Identities;
   providing the list of the plurality of CGIs to the mobile station;
   activating monitoring for an event indicative of a change in the presence status of the mobile station with respect to said geographical area of interest;
   signalling a notification to the client in response to detection of such event;
   receiving an area event notification cancellation request from the client at the location service entity;
   checking whether the mobile station is in the geographical area of interest; and
   when the mobile station is checked as in the geographical area of interest, de-activating the monitoring at the mobile station and purging the list of the plurality of Cell Group Identities from the mobile station.

2. A method as claimed in claim 1, wherein the monitoring is executed via checking at the mobile station a current CGI of the mobile station against the list, and the geographical area of interest is further specified by one or more altitudes, and the method further comprising:
   mapping the one or more altitudes into the list of the plurality of CGIs.

3. A method as claimed in claim 2, wherein the monitoring is executed whenever the mobile station moves.

4. A method as claimed in claim 1, further comprising:
   signaling a notification of a checking result to the client,
   wherein the client resides externally to the mobile station, the one or more radio access entities, or a combination thereof.

5. A method as claimed in claim 1, further comprising:
   signaling a notification of successful cancellation to the client,
   wherein the monitoring is based on at least one routing area, service area, or a combination thereof, determined based on said information of the area of interest.

6. A method as claimed in claim 1, wherein the request contains further information regarding the event to reported, the further information defining whether entering or leaving or the area of interest shall be reported.

7. A method as claimed in claim 4, wherein the area event notification cancellation request is triggered by one or more request implementation dependent timer expirations, one or more mobile station privacy setting changes to disallow the request, or a combination thereof.

8. A method according to claim 7, wherein the request is cancelled after the signalling notification in response to the event detection.

9. A method according to claim 7, wherein said signalling notification is responsive to detection of said event over a predetermined time period, and the one or more request implementation dependent timer expirations occur in a gateway mobile location center, the mobile station, or a combination thereof.

10. A method according to claim 1 wherein successive signalling within a predetermined time period is limited.

11. A method according to claim 10, wherein a location service (LCS) client defines the predetermined time period such that successive signalling is limited.

12. A method according to claim 10, wherein a network operator defines the predetermined time period such that successive signalling is limited.

13. A method according to claim 1 further comprising confirming the location of the mobile station responsive to the signalling location, wherein the geographical area of interest determined by a commercial entity other than a network operator and a cellular service provider, an end user other than a user of the mobile station, or a combination thereof.

14. A method according to claim 13, wherein the area of interest is taken into consideration in cell selection, and the commercial entity includes one or more advertisers.

15. A method according to claim 13, wherein the step of receiving an area event notification request is sent by the end user and responsive to a location update, and the end user is a parent of the user of the mobile station.

16. An apparatus, comprising:
a location service entity configured to receive an area event notification request from a client containing information of the identity of a target mobile station and a geographical area of interest specified by a predefined shape, and configured to receive an area event notification cancellation request from the client at the location service entity;
a Servicing Mobile Location Center (SMLC) configured to map the shape into a list of a plurality of Cell Group Identities and configured to provide the list of CGIs to the mobile station;
a monitoring entity configured to monitor, in response to receiving said area event notification request, an event indicative of a change in the presence status of the target mobile station with respect to said geographical area of interest and configured to signal a notification to the client in response to detection of such event, the monitoring entity is further configured to check whether the mobile station is in the geographical area of interest, and when the mobile station is checked as in the geographical area of interest, to de-activate the monitoring at the mobile station and purge the list of the plurality of Cell Group Identities from the mobile station.

17. An apparatus as claimed in claim 16, wherein the monitoring entity provided in association with the target mobile station, and the monitoring is executed via checking at the target mobile station a current CGI of the target mobile station against the list.

18. An apparatus as claimed in claim 17, wherein the monitoring is executed whenever the mobile station moves.

* * * * *